United States Patent [19]
Pawlowski

[11] Patent Number: 5,854,794
[45] Date of Patent: Dec. 29, 1998

[54] DIGITAL TRANSMISSION FRAMING SYSTEM

[75] Inventor: Christopher Andrew Pawlowski, Phoenix, Ariz.

[73] Assignee: AG Communication Systems Corporation, Phoenix, Ariz.

[21] Appl. No.: 767,558

[22] Filed: Dec. 16, 1996

[51] Int. Cl.[6] ....................................................... H04L 7/08
[52] U.S. Cl. ............................................. 370/509; 375/368
[58] Field of Search ................................... 370/503, 506, 370/509, 510, 520; 375/354, 359, 368

[56] References Cited

U.S. PATENT DOCUMENTS

| | | | |
|---|---|---|---|
| 4,984,238 | 1/1991 | Watanabe et al. | 370/509 |
| 5,282,206 | 1/1994 | Ishihara et al. | 370/509 |
| 5,331,670 | 7/1994 | Sorbara et al. | 370/509 |
| 5,608,734 | 3/1997 | Sandler et al. | 370/509 |
| 5,671,227 | 9/1997 | Keller et al. | 370/509 |

*Primary Examiner*—Chi H. Pham
*Assistant Examiner*—Ricky Q Ngo
*Attorney, Agent, or Firm*—David J. Zwick; Gregory G. Hendricks

[57] ABSTRACT

A digital transmission framing system utilizing an address array containing pointers to a framing pattern reference register. The address array contains an entry for each set of possible framing bits. Pointer values reference the last bit of a consecutive-bit sub-pattern of the reference register that the previously received bits in this frame bit position have matched. As data bits are received, the associated pointer value is incremented by one to point to the next bit of the reference register, and the received data bit is compared to the newly referenced reference register bit. If the received data bit matches the newly referenced reference register bit, the associated pointer is updated with the incremented value and the corresponding frame bit position of the received data bit remains a candidate for the actual framing bit position. This matching operation continues until only one eligible framing bit position is identified in the input data frame. Bit 0 of the framing bit pattern in the transmission stream is then identified and a synchronization signal is generated.

6 Claims, 6 Drawing Sheets

FIG. 6

DIGITAL TRANSMISSION FRAMING SYSTEM

FIELD OF THE INVENTION

The present invention relates to digital transmission, and more particularly, to a system for detecting framing bits in a digital time division transmission stream.

BACKGROUND OF THE INVENTION

In digital transmission systems, it is necessary to synchronize the receiving means with the incoming digital transmission signal. In time division digital transmission systems, information is transmitted in frames and synchronization is achieved through a process called framing in which a repeating framing pattern in the transmission data stream is used to uniquely identify the start of each frame.

In typical prior art framing systems, framing is achieved by comparing a reference framing pattern to the received transmission signal. The reference framing pattern is advanced through the transmission signal as the signal is received, and when a match between the reference pattern and the received transmission signal is detected, a synchronization signal is generated. If the framing pattern detected in the transmission signal is a false framing pattern that emulates the true framing pattern, which can be caused by a particular sequence of bits present in the subscriber data, cyclic redundancy check (CRC) errors, for example, will be generated and the framing system will again attempt synchronization.

The framing pattern is carried in a specific framing bit, usually the first or last bit of a frame, with multiple frames required to transmit a complete framing pattern. In prior art framing systems, a storage array that holds approximately the number of frames required for a complete framing pattern is typically part of the circuit. However, as the size of transmission frames increases to accommodate the need for ever increasing bandwidth, the storage array size, and hence the cost, power and heat dissipation requirements, increase as well.

Prior art framing systems are typically employed at the end-points of a telephone network where the transmission data is multiplexed or demultiplexed. These framing systems are responsible for establishing framing so that the data can be successfully transmitted over the network and the data payload of the frames can be "unpacked" and utilized at the destination. These framing system must establish framing very quickly so that data flow can begin.

In addition to the end-point framing systems, there is also a need for framing systems located at intermediate nodes in the network for the purpose of monitoring the transmission data and reporting, for example, data errors and other error events. These framing systems are not as critical in the network as the end-point framing systems because an "out-of-frame" condition at an intermediate node framing system doesn't affect delivery of data at the end-points. Hence, these framing systems can be designed with relaxed requirements in terms of time to establish framing. The relaxed timing requirements can also lead to a circuit with lower storage array and gate count requirements.

One approach that is used to reduce the storage array size is to perform the framing pattern comparison on only a portion of the transmission frame. One technique used in this approach performs the comparison using an array that holds less than the total frames required for a complete framing pattern, for example half of the total frames required, and searches the array for any match on half of the pattern. Another technique compares only the even numbered framing bit positions to the framing pattern. The problem with these prior techniques is the increased possibility of synchronizing on a false framing pattern.

Accordingly, it is an object of the present invention to provide a framing system that requires less storage than typical prior art systems, while at the same time utilizing all available framing bit information present in the transmission stream.

Another object of the invention is to provide a framing system with lower storage array and gate count requirements than typical prior art systems, yet still provide framing in a relatively fast time.

SUMMARY OF THE INVENTION

The present invention describes a digital transmission framing system which utilizes the concept of an address array containing pointers to a framing pattern reference register specific to the format of the data transmission stream.

Each data bit received belongs to a set of potential framing bits comprising data bits in the same corresponding position in subsequent transmission format data frames. The address array contains an entry for each frame bit position that defines a possible set of framing bits in the transmission data stream.

For example, the D4 Super-Frame format is made up of 12 standard 193-bit transmission frames having a framing bit at the start of each standard frame. The framing pattern for this format is a 12-bit pattern comprising the framing bits of the 12 frames of the super-frame. Until framing is established, there are 193 possible sets of framing bits in the transmission stream and the address array for this format would have 193 entries. It is readily seen that there are only 193 sets of framing bits because the $194^{th}$ bit belongs to the set containing the first bit, the $195^{th}$ bit belongs to the set containing the second bit, and so on.

Hence, an arbitrary set of 193 consecutive bits taken from a D4 Super-Frame format transmission stream will contain one bit from each of the potential framing bit positions of the transmission stream, and in particular will contain the actual framing bit position. However, the framing bit contained in the arbitrary set of transmission bits could be any one of the 12 bits that form the framing pattern for this transmission format.

As data bits are received, the pointer word in the address array corresponding to the frame bit position of the received data bit is used to access the reference register. The pointer word contains a pointer to the last bit of a consecutive bit sub-pattern of the reference register that the previously received bits in this frame bit position have matched. The pointer is incremented by one to point to the next bit of the reference register, and the received data bit is compared to the newly referenced reference register bit.

If the received data bit matches the newly referenced reference register bit, the associated pointer is updated with the incremented value and the corresponding frame bit position of the received data bit remains a candidate for the one and only framing bit position. If the received data bit does not match the newly referenced reference register bit, a dummy value is written into the pointer word indicating that the corresponding frame bit position is no longer eligible as a framing bit position.

This matching operation continues until only one eligible framing bit position is identified in the input data frame. Bit 0 of the framing bit pattern in the transmission stream is then identified and a synchronization signal is generated.

DESCRIPTION OF THE PREFERRED EMBODIMENT

The framing system of the present invention preferably operates on a Time Division Multiplexed (TDM) input data stream of the Extended Super-Frame (ESF) format. The ESF format consists of 193-bit data frames that are grouped into "extended" super-frames consisting of 24 data frames. In the ESF format, the framing bits are located in the first bit positions of each of the constituent frames. However, only every fourth frame contains a framing bit. The bit-0 positions of the intermediate frames between framing bit frames carry facility data link (FDL) message bits and CRC bits.

The framing pattern for ESF format transmissions is a repeating 6-bit pattern consisting of "001011". The ESF framing bit sequence is illustrated in Table 1, with FDL message bits designated as "m" and CRC bits designated as "c".

Figure 1:
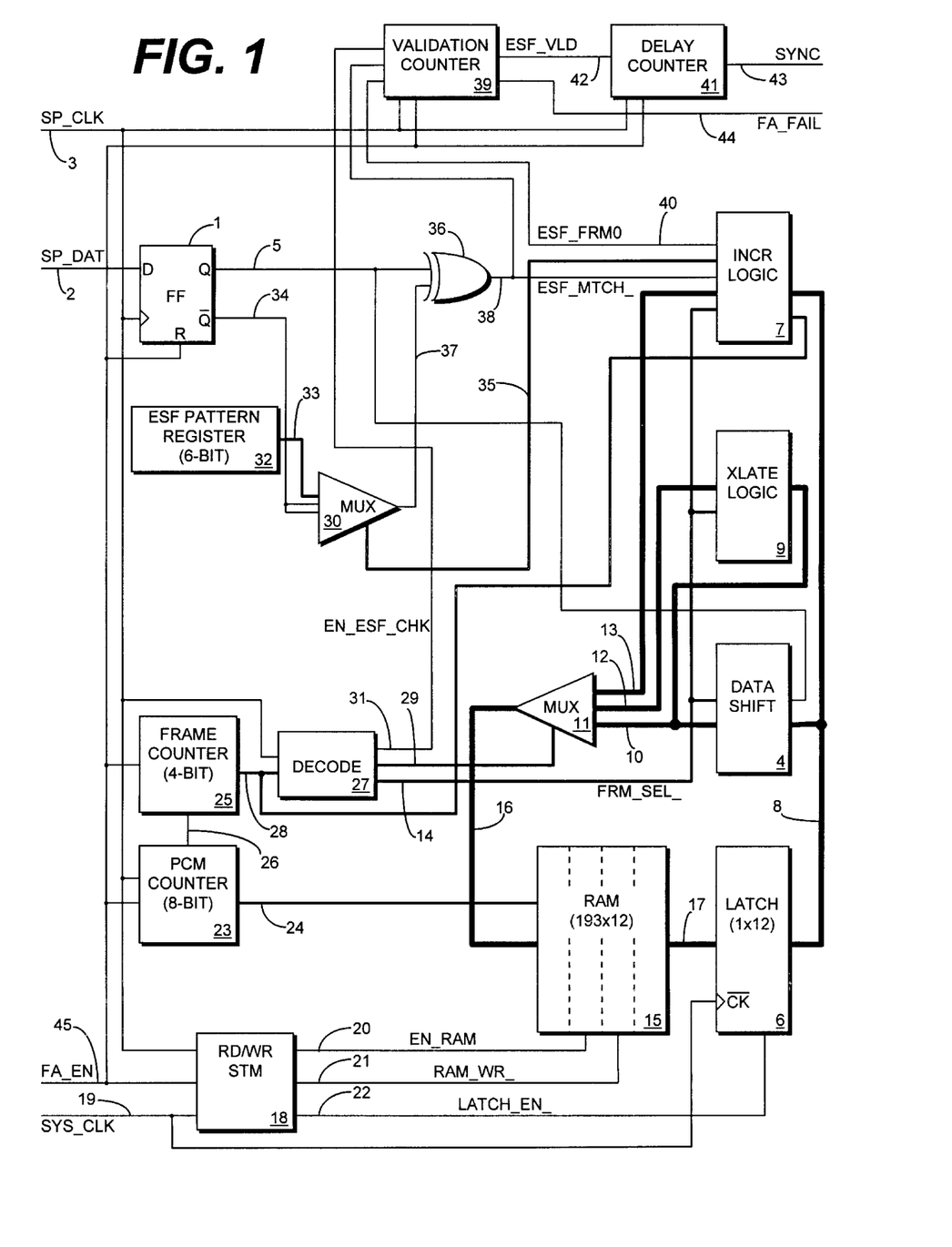
FIG. 1 is a block diagram of a preferred embodiment of a data transmission framing system.

FIG. 1 is a block diagram of a framing system in accordance with the present invention. The system comprises flip-flop 1 which receives transmission data bits on signal SP_DAT over connection 2 and the associated data clock signal SP_CLK over connection 3 from a control system (not shown). Flip-flop 1 is connected to data shifter block 4 by connection 5. Data shifter block 4 is further connected to latch 6 and increment logic block 7 by 12-bit connection 8, and to translate logic block 9 over 12-bit connection 10. Data shifter block 4, translate logic block 9 and increment logic block 7 are further connected to the input of MUX 11 over 12-bit connections 10, 12 and 13. RAM 15 is connected to the output of MUX 11 over 12-bit connection 16, and to latch 6 over 12-bit connection 17.

TABLE 1

| ESF Framing Bit Pattern | | | |
|---|---|---|---|
| Frame Number | Framing Pattern | Frame Number | Framing Pattern |
| 0 | m | 12 | m |
| 1 | c | 13 | c |
| 2 | m | 14 | m |
| 3 | 0 | 15 | 0 |
| 4 | m | 16 | m |
| 5 | c | 17 | c |
| 6 | m | 18 | m |
| 7 | 0 | 19 | 1 |
| 8 | m | 20 | m |

TABLE 1-continued

| ESF Framing Bit Pattern | | | |
|---|---|---|---|
| Frame Number | Framing Pattern | Frame Number | Framing Pattern |
| 9 | c | 21 | c |
| 10 | m | 22 | m |
| 11 | 1 | 23 | 1 |

Read/write state machine 18 receives data clock signal SP_CLK over connection 3 and a system clock signal SYS_CLK from the control system over connection 19 and provides write control signals EN_RAM and RAM_WR_ to RAM 15 over connections 20 and 21 and write control signal LATCH_EN_ to latch 6 over connection 22. Latch 6 further receives system clock signal SYS_CLK over connection 19. PCM 8-bit counter 23 receives data clock signal SP_CLK over connection 3 and provides an address signal to RAM 15 over 8-bit connection 24 and a carry out signal to 4-bit frame counter 25 over connection 26. Frame counter 25 provides a counter output signal to decoder 27 and increment logic block 7 over 4-bit connection 28. Decoder 27 further receives data clock signal SP_CLK over connection 3 and provides a select signal to MUX 11 over 2-bit connection 29, an enable signal EN_ESF_CHK to validation counter 39 over connection 31 and a control signal FRM_SEL_ to data shifter block 4, translate logic block 9 and increment logic block 7 over 4-bit connection 14. MUX 30 receives the output of ESF pattern register 32 over 6-bit connection 33, the inverted output of flip-flop 1 over connection 34 and a select signal from increment logic block 7 over connection 35. MUX 30 provides an output signal to XOR gate 36 over connection 37. XOR gate 36 further receives the output signal from flip-flop 1 over connection 5 and provides a signal ESF_MTCH_ to increment logic block 7 over connection 38. Validation counter 39 further receives output signal ESF_MTCH_ of XOR gate 36 over connection 38, signal ESF_FRM0 from increment logic block 7 over connection 40 and data clock signal SP_CLK over connection 3. Validation counter 39 provides a validation signal ESF_VLD to delay counter 41 over connection 42 and a frame align fail signal FA_FAIL to the control system over connection 44. Delay counter 41 further receives data clock signal SP_CLK over connection 3 and provides a frame align synchronization signal SYNC to the control system over connection 43. A system enable signal FA_EN from the control system is received over connection 45 and serves to reset read/write state machine 18, PCM counter 23, frame counter 25, flip-flop 1, validation counter 39 and delay counter 41.

In this illustrative embodiment, the ESF framing system uses an algorithm which calculates and stores a pointer to a bit position of the framing pattern reference register. The pointer word contains a pointer to the last bit of a consecutive bit sub-pattern of the reference register that the previously received bits in this frame bit position have matched. As a transmission data bit is received, the corresponding pointer is incremented by one to point to the next bit of the reference register, and the received data bit is compared to the newly referenced reference register bit. RAM 15 is first loaded with valid input data before the pointer algorithm is executed.

Since the ESF framing bits occur in every fourth 193-bit frame, an arbitrary set of 772 consecutive bits (4×193) taken from an ESF transmission stream will contain one bit from each of the potential framing bit positions of the transmission stream, and in particular will contain the actual framing bit position. Therefore, the pointer array has 772 locations. Since the ESF framing pattern is six bits long, a 3-bit pointer is sufficient to point to any of the positions of the 6-bit ESF framing pattern reference register.

In the illustrative embodiment of the present invention, pointer address array RAM 15 is implemented as a 193× 12-bit RAM that is partitioned into four 193×3 "frame bit RAMs," rather than a 772×3-bit RAM. This is done to accommodate general implementations wherein the RAM may be shared by framing circuits directed to other common transmission stream formats.

When the framing system receives an enable signal, the pointer address array is loaded with valid pointers during a setup operation. In the setup operation, one transmission data bit is shifted into the least significant location of each of the 772 locations of the pointer address array. A second bit is then shifted into each array location. Because ESF framing bits occur in every fourth 193-bit frame, or each 772 positions, this loads the array locations with consecutive potential framing bits, and in particular, one location is loaded with the actual framing bits. As the third transmission data bit is read, this bit and the previous two bits from the corresponding array location are translated to either a valid framing pattern reference register pointer or a dummy value. If the three transmission data bits form a sub-pattern of the ESF framing pattern, the corresponding position of these bits in the transmission data stream is a candidate for the actual framing bit position. The three bits are translated into a pointer value pointing to the position in the framing pattern reference register of the last bit of the matched sub-pattern and then loaded into the pointer array. If the three transmission data bits do not form a sub-pattern of the ESF framing pattern, the corresponding position of these bits in the transmission data stream cannot be a candidate for the actual framing bit position. Bit combinations that do not form sub-patterns of the ESF framing pattern are translated into a dummy value of "111" which is loaded into the corresponding location of the pointer array.

For example, if the three received transmission data bits are "100", this matches a sub-pattern of the ESF framing pattern "001011" that comprises bit positions 5, 0 and 1. Translation logic would therefore load a value of "001" into the corresponding location of the pointer array.

After the setup operation is complete, each pointer array location contains a valid pointer to a bit position of the framing pattern reference register, or a dummy value. As subsequent transmission bits are read, the corresponding pointer is incremented by one to point to the next framing pattern reference register bit, and the received transmission data bit is compared to the pointed-to reference pattern bit. If the received bit matches the pointed-to reference pattern bit, the incremented pointer value is loaded into the pointer array location and the corresponding position of the received transmission data bit in the transmission stream remains a candidate for the actual framing bit position. If the received bit and the pointed-to reference pattern bit do not match, the dummy value is loaded into the corresponding pointer array location.

In more detailed operation, a control system (not shown) monitors the ESF transmission data stream for framing. When an out-of-frame condition is detected, the control system asserts frame alignment enable signal FA_EN over connection 45. Signal FA_EN operates to initialize PCM counter 23, frame counter 25, flip-flop 1, validation counter 39, delay counter 41 and read/write state machine 18.

As input data bits from the transmission stream are clocked into flip flop 1, data shifter block 4 shifts bits into the least significant locations of each of the 193 locations of the four 193×3 frame bit RAMs of RAM 15. Data shifter block 4 acts on all locations of a frame bit RAM before acting on the next frame bit RAM.

Data clock signal SP_CLK on connection 3 clocks an input data bit into flip-flop 1 over connection 2 on signal SP_DAT. The data out signal of flip-flop 1 is asserted over connection 5 to data shifter block 4. Data shifter block 4 also receives a 12-bit word from latch 6 over connection 8 comprising the four 3-bit frame bit RAM words for a given one of the 193 locations of 193×12 RAM 15.

Data shifter 4 operates on the 12-bit word and rewrites the modified word back into RAM 15 over connections 10 and 16 through MUX 11. PCM counter 23 receives the next data clock pulse over connection 3 and increments the RAM address signal value on connection 24. The next 12-bit RAM word is written into latch 6 over connection 17 and the cycle repeats.

Figure 2:
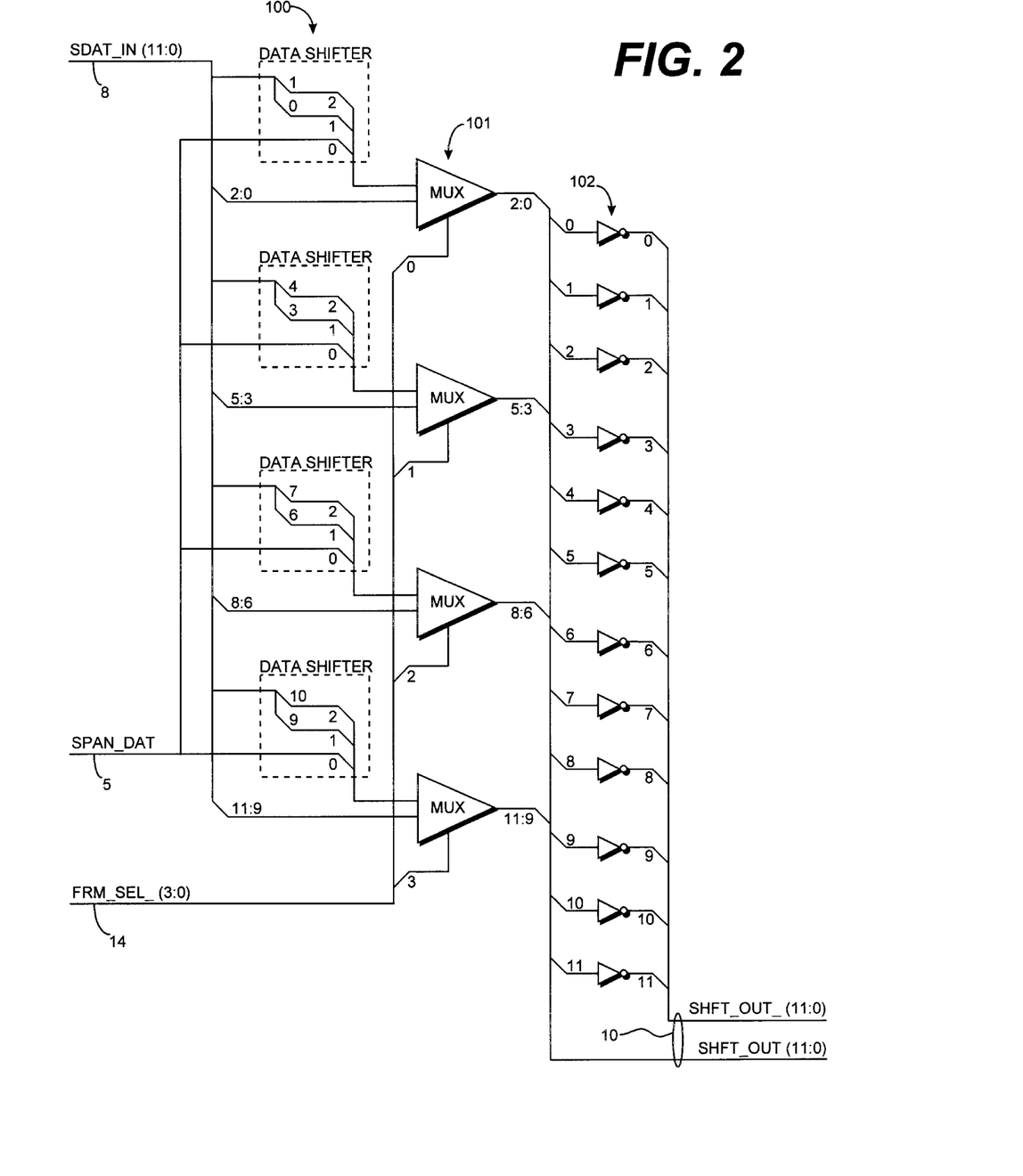
FIG. 2 is a logic diagram of a data shifter circuit of the present invention.

FIG. 2 shows a logic diagram for data shifter block 4. The values of the 12-bit word in latch 6 are asserted on signal SDAT_IN over connection 8. Signal SDAT_IN is divided into four 3-bit sub-signals with each sub-signal connected to the "B" input of one of MUXs 101, and the two lower order bits of each sub-signal connected to one of data shifters 100. The data out signal of flip-flop 1 is asserted over connection 5 to the least significant output bit of each of data shifters 100. The output signals of data shifters 100 are connected to the "A" input of MUXs 101. The outputs of MUXs 101 are connected to signal inverters 102 to provide signal SHFT_OUT and inverted signal SHFT_OUT_ over connections 10.

Signal FRM_SEL_ over connection 14 from decode block 27 is decoded from counter output signal FRM_CNT over connection 28 from frame counter 25. Signal FRM_SEL_ operates as a select signal to MUXs 101, and causes one of MUXs 101 to select the output of its associated data shifter 100 while causing the other MUXs 101 to pass through over connections 10 the received 3-bit data signals.

The truth table for signal FRM_SEL_ is shown in Table 2. Frame counter 25 receives a counter input signal from PCM counter 23 carry out signal over connection 26. This counter input signal is pulsed each time PCM counter 23 reaches a terminal count of 193, corresponding to the number of bits in a frame. Thus, data shifter block 4 shifts one full input frame of data into the least significant locations of successive frame bit RAMs, returning to frame bit RAM 0 after operating on frame bit RAM 3.

TABLE 2

FRM_SEL_ Truth Table

| FRM_CNT | FRM_SEL_ |
|---------|----------|
| XX00    | 1110     |
| XX01    | 1101     |
| XX10    | 1011     |
| XX11    | 0111     |

Two 4-frame data input cycles shift input data into RAM 15 resulting in the two least significant locations of the 3-bit frame bit RAMS being loaded with input data.

The third 4-frame data input cycle results in the two previous bits and the newly received third input data bit of each 3-bit frame bit RAM word being translated into a 3-bit framing pattern reference pointer. This is accomplished by selecting the output of MUX 11 to be the output of translation logic block 9.

MUX 11 is controlled by select signal RAM_IN_SEL over connection 29 from decode block 27. Signal RAM_

IN_SEL is decoded from counter output signal FRM_CNT on connection 28 from frame counter 25. Table 3 shows the truth table for signal RAM_IN_SEL. As indicated by Table 3, MUX 11 selects input from data shifter block 4 over connection 10 for the first two 4-frame cycles. For the third 4-frame cycle, MUX 11 selects input from translation logic block 9 over connection 12. For the fourth and subsequent 4-frame cycles, MUX 11 selects input from increment logic block 7 over connection 13.

TABLE 3

RAM_IN_SEL Truth Table

| FRM_CNT | RAM_IN_SEL | Component |
|---------|------------|-----------|
| 00XX | 10 | DATA SHIFT |
| 01XX | 10 | DATA SHIFT |
| 10XX | 01 | XLATE |
| 11XX | 00 | INCR |

Figure 3:
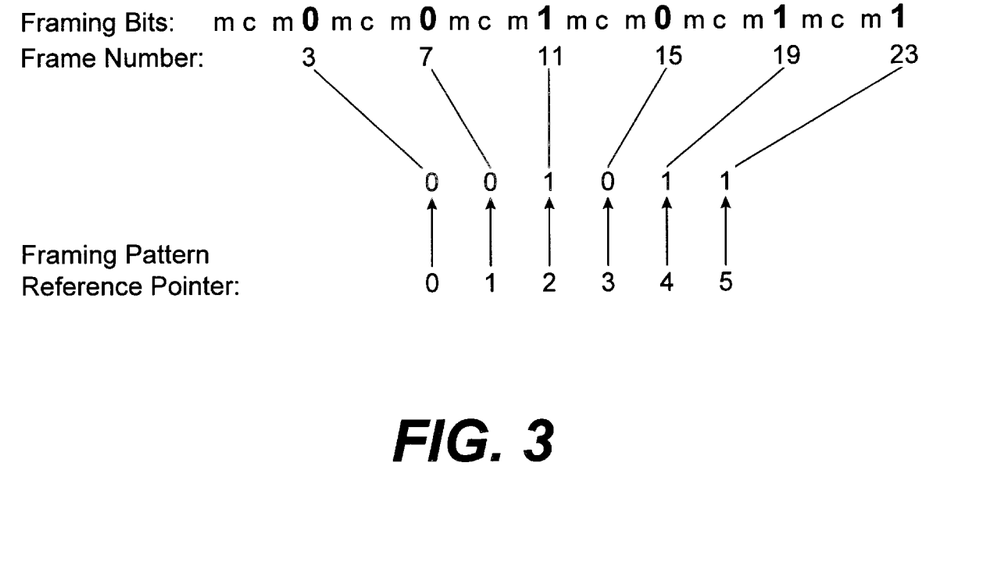
FIG. 3 is a diagram depicting the relationship of the framing bits and the framing pattern reference pointers of the present invention.

As stated above, the two previous bits and the newly received third input data bit of each 3-bit frame bit RAM word are translated into a 3-bit framing pattern reference pointer by translation logic block 9. Three consecutive bits of the 6-bit ESF framing pattern are sufficient to identify a unique sub-pattern of the full framing bit pattern. Translation logic block 9 translates the three received bits into a framing pattern reference pointer corresponding to the position in the pattern of the last received input data bit. If the last three received data bits do not correspond to a framing pattern position, a dummy value of 7 is written to the frame bit RAM word. FIG. 3 shows the relationship of the framing bits and the framing pattern reference pointer. Table 4 shows the translation logic truth table.

TABLE 4

Translation Logic Truth Table

| Received Bits | Reference Pointer | Xlated Bits |
|---------------|-------------------|-------------|
| 000 | — | 111 |
| 001 | 2 | 010 |
| 010 | 3 | 011 |
| 011 | 5 | 101 |
| 100 | 1 | 001 |
| 101 | 4 | 100 |
| 110 | 0 | 000 |
| 111 | — | 111 |

Figure 4:
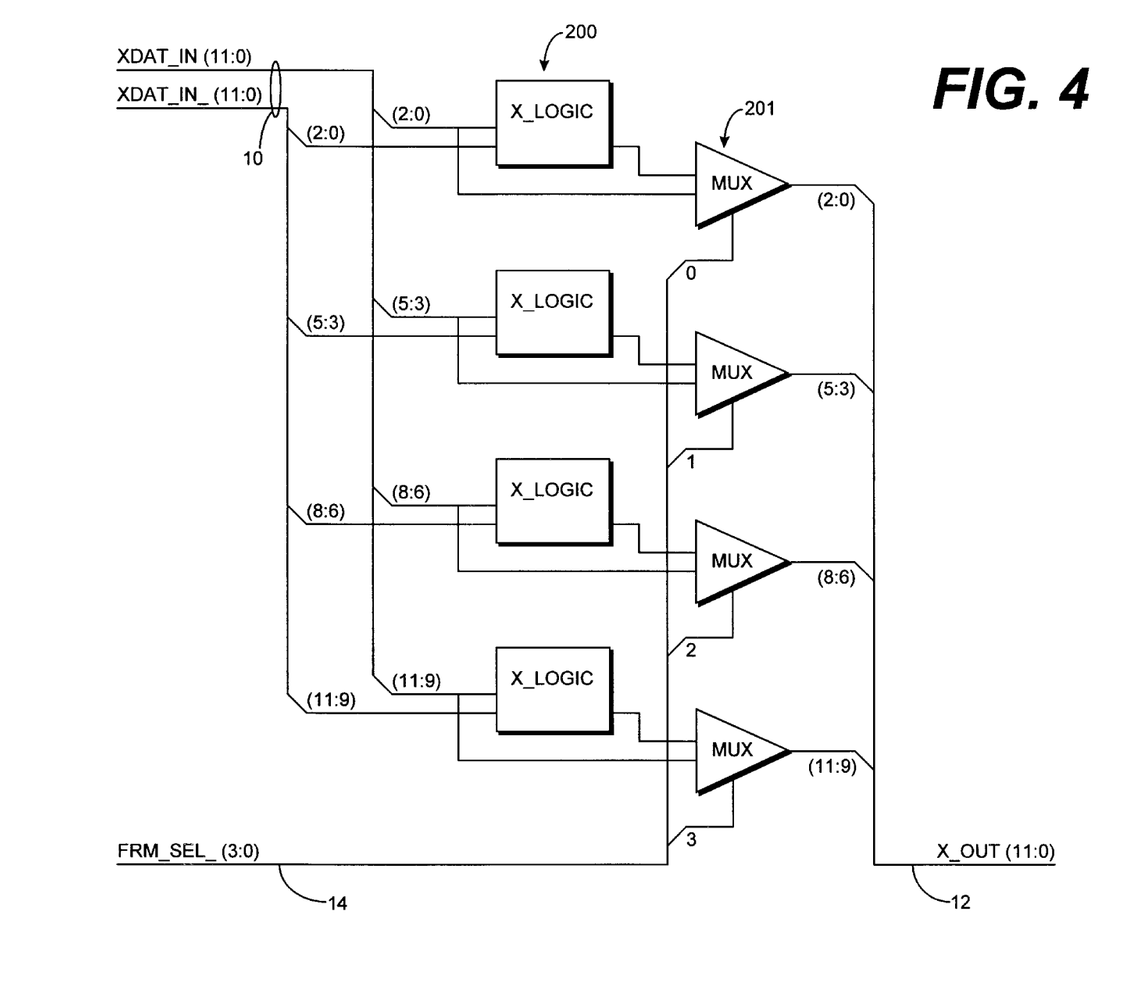
FIG. 4 is a logic diagram of a translation logic circuit of the present invention.

FIG. 4 shows a logic diagram of translation logic block 9. Signals XDAT_IN and XDAT_IN_ are received from data shifter block 4 over connections 10. Selector signal FRM_SEL_ to MUXs 201 is received from decoder block 27 over connection 14. Translation block output signal X_OUT is transmitted over connection 12 to MUX 11. Each of X_LOGIC circuits 200 receives a frame bit RAM word over connections 10 and produces an output word according to the translation logic truth table shown in Table 4. Signal FRM_SEL_ operates as a select signal to MUXs 201, and causes one of MUXs 201 to select the output of its associated X_LOGIC circuit 200 while causing the other MUXs 201 to pass through over connection 12 the received 3-bit data signals.

At the completion of the third 4-frame data input cycle, each frame bit RAM word contains either a 3-bit framing pattern reference pointer or a dummy value of 7, in accordance with Table 4. In the fourth and subsequent 4-frame read cycles, each frame bit RAM word is read from latch 8, valid framing pattern reference pointer values are incremented to point to the next bit in the framing pattern reference register, and the value of the newly received input data bit is compared to the value of the framing pattern reference bit referenced by the incremented framing pattern reference pointer.

If the received input data bit and the framing pattern reference bit have the same value, the frame bit RAM is updated with the incremented framing pattern reference pointer. If the two bits do not match, a dummy value of 7 is written to the frame bit RAM word. Table 5 shows the increment logic truth table.

TABLE 5

Increment Logic Truth Table

| ESF_MTCH | Pointer Bits In | Pointer Bits Out |
|----------|-----------------|------------------|
| 0 | XXX | 111 |
| 1 | 000 | 001 |
| 1 | 001 | 010 |
| 1 | 010 | 011 |
| 1 | 011 | 100 |
| 1 | 100 | 101 |
| 1 | 101 | 000 |
| 1 | 110 | 111 |
| 1 | 111 | 111 |

Figure 5:
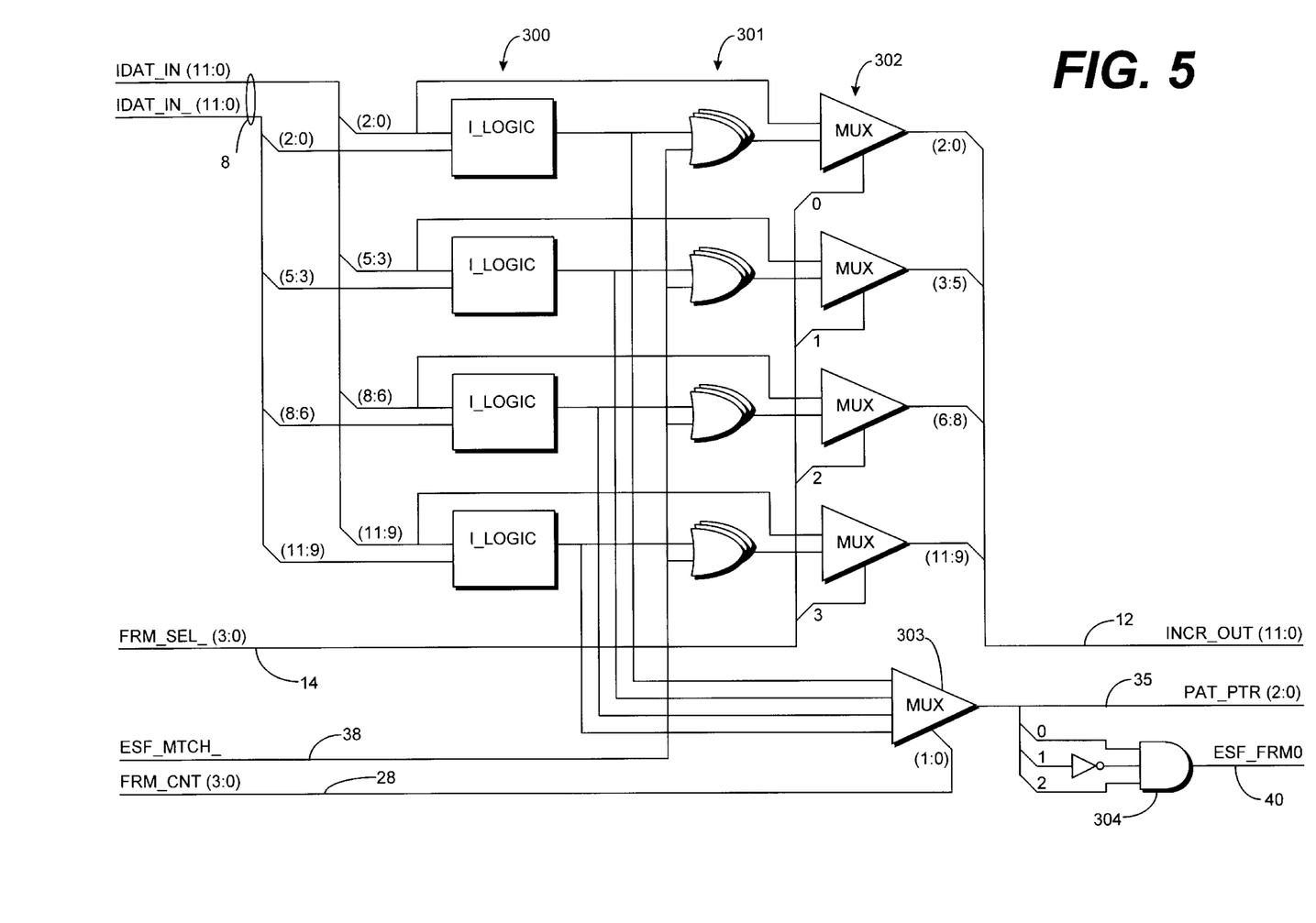
FIG. 5 is a logic diagram of an increment logic circuit of the present invention.

FIG. 5 shows a logic diagram of increment logic block 7. Signals IDAT_IN and IDAT_IN_ are received from latch 6 over connections 8. MUX selector signal FRM_SEL_ is received from decoder block 27 over connection 14. Signal ESF_MATCH_ is received from XOR gate 36 over connection 38. Signal FRM_CNT is received from frame counter 25 over connection 28.

In operation, I_LOGIC circuits 300 each receive a frame bit RAM word on signals IDAT_IN and IDAT_IN_ over connections 8. I_LOGIC circuits 300 operate on the received frame bit RAM words according to Table 5 to produce an incremented framing pattern reference pointer signal, and transmit output signals to OR gates 301 and MUX 303.

MUX 303 receives a select signal FRM_CNT which operates to select the active frame bit RAM. MUX 303 output signal PAT_PTR over connection 35 is transmitted to MUX 30 as a select signal, and operates to select the framing pattern reference bit that is compared with the received input data bit. XOR gate 36 receives the output signal of MUX 30 over connection 37 and the data output signal from flip-flop 1 over connection 5. Signal ESF_MTCH_ from XOR gate 36 over connection 38 indicates if there is a match between the input data bit and the framing pattern reference bit.

MUX 30 receives the 6-bit framing pattern reference register from ESF pattern register 32 over connection 33 as input signals 0 to 5, and the inverted input data bit signal from flip-flop 1 over connection 34 as input signals 6 and 7. Invalid framing pattern reference pointer value 6 and dummy value 7 will cause MUX 30 to transmit the inverted received input data bit signal and will result in a "no match" ESF_MTCH_ signal from XOR gate 36 over connection 38.

OR gates 301 also receive signal ESF_MTCH_ over connections 38. This signal and each of the bits of 3-bit I_LOGIC output signals to OR gates 301 are OR'd together and are transmitted to MUXs 302. A "no match" ESF_MTCH_ signal will result in an output of the dummy value 7 from OR gates 301.

Each MUX 302 receives the output signal from its associated OR gate 301 and an unmodified frame bit RAM word from latch 6 over connection 8. Signal FRM_SEL_ over connections 14 operates as a select signal to MUXs 302, and causes one of MUXs 302 to select the output of its associated I_LOGIC circuit 300 while causing the other MUXs 302 to pass through over connection 12 the received 3-bit data signals.

AND gate 304 produces signal ESF_FRM0 over connection 40 which indicates that the received input data bit matches framing pattern position 5, which is the framing pattern position just prior to frame 0 of the input data stream.

Figure 6:
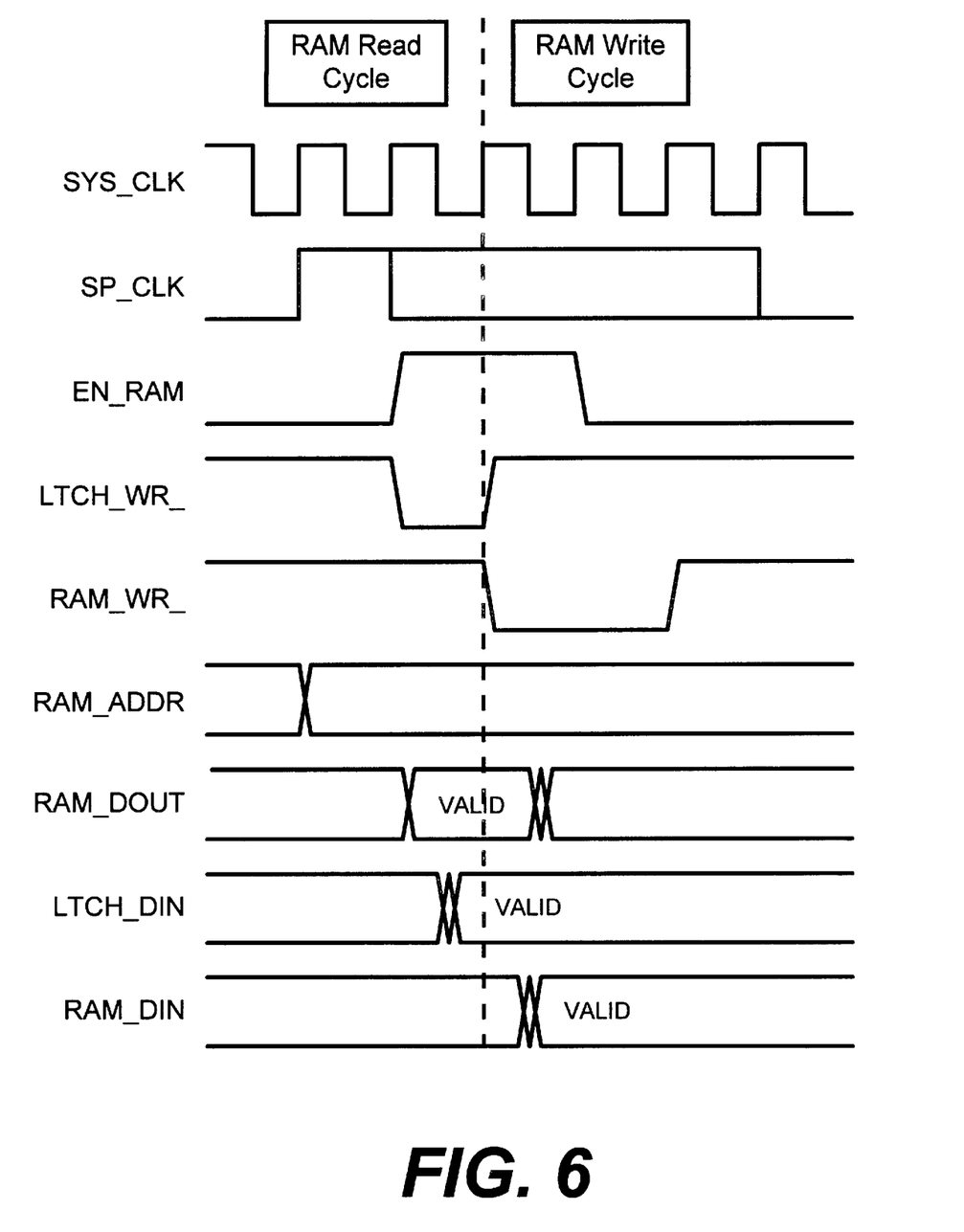
FIG. 6 is the timing diagram of a read/write state machine of the present invention.

Read/write state machine 18 controls the timing of the reading of data from RAM 15 into latch 6 over connection 17, and the writing of data into RAM 15 from data shifter block 4, translation logic block 9 and increment logic block 7 through NUX 11 over connection 16. A 12-bit word is clocked into latch 6 and presented to data shifter block 4, translation logic block 9 and increment logic block 7 for modification. The modified word is then clocked back into RAM 15. The timing diagram for read/write state machine 18 is shown in FIG. 6.

Read/write state machine 18 is clocked by signal SYS_CLK received over connection 19. The rising edge of signal SP_CLK received over connection 3 initiates the read cycle from RAM 15 into latch 6. The RAM address signal is transmitted from PCM counter 23 over connection 24. The output data from RAM 15 over connection 17 is clocked into latch 6 by the first falling edge of signal SYS_CLK after write enable signal LATCH_EN_ is asserted. A write cycle into RAM 15 over connection 16 always immediately follows each read cycle. The actual writing of data into RAM 15 takes place on the falling edge of signal EN_RAM received by RAM 15 over connection 20. Signal FA_EN received by read/write state machine 18 over connection 45 operates to initialize the state machine.

Read/write state machine 18 cycles through a read and a write cycle for each input data bit received on signal SP_DAT over connection 2. Read/write state machine 18 is relatively independent of the duty cycle of signal SP_CLK. However, the strobe duration of signal SP_CLK must span at least one signal SYS_CLK cycle of high and one of low per input data bit received, and the period of signal SP_CLK must span at least five signal SYS_CLK periods.

Validation counter 39 asserts signal ESF_VLD over connection 42 to delay counter 41 when one and only one bit location in the input data stream has been identified as containing the framing information, and the last bit of the framing pattern has been received. Synchronization signal SYNC from delay counter 41 over connection 43 must line up with the first bit following bit 0 of frame 0. However, bit 0 of frame 0 is an FDL message bit. Validation counter 39 asserts signal ESF_VLD when the last framing bit of the ESF frame is encountered, which is located at bit 0 of frame 23. This initiates a counter in delay counter 41 which then pulses signal SYNC over connection 43 following a one frame delay until bit 1 of frame 0 is received. Signal SYNC is pulsed each extended super-frame interval after framing is initially established.

Validation counter 39 is enabled by a signal EN_ESF_CHK from decoder 27 over connection 31, which causes the counter to begin. This enable signal is asserted at the start of the fourth 4-frame data input cycle. Each time a match occurs between the received input data bit and the expected bit in the framing pattern reference register, signal ESF_MTCH_ from XOR gate 36 over connection 38 is generated that causes a bit counter in validation counter 39 to reset to zero. The data clock signal SP_CLK received over connection 3 operates to cause this bit counter to increment by one.

When the bit counter reaches a terminal value of 772 and signal ESF_MTCH is asserted, one and only one framing bit position has been identified. The next occurrence of the concurrent assertion of signals ESF_MTCH_ and ESF_FRM0 cause signal ESF_VLD over connection 42 to be generated.

If validation counter 39 reaches a terminal value of 772 and there is not a concurrent assertion of signal ESF_MATCH, this indicates that all bit positions have been eliminated for the framing bit position. Signal FA_FAIL is then asserted from validation counter 39 over connection 44.

Although this illustrative embodiment teaches a system for framing an ESF transmission stream, those skilled in the art will recognize that the inventive concepts disclosed herein may be applied to any transmission stream that includes a repeating pattern of framing bits. These transmission streams include, but are not limited to, D4, T1DM, and SLC-96 formatted transmission streams.

While the inventive system has been particularly shown and described with reference to various embodiments, it is not intended to be exhaustive nor to limit the invention to the embodiments disclosed. It will be apparent to those skilled in the art that modifications can be made to the present invention without departing from the scope and spirit thereof. It is intended that the scope of the invention be defined by the claims appended hereto and their equivalents.

What is claimed is:

1. A digital transmission framing system including a source of a predetermined framing pattern, and a source of an input signal comprising data and framing information, said framing system comprising:

means for pattern matching connected to said input signal source and said predetermined framing pattern source, said pattern matching means operated to compare said input signal information to said predetermined framing pattern, and generate a match signal when a portion of said framing pattern matches a portion of said input signal;

means for storage connected to said pattern matching means, said storage means operative for storing a plurality of framing pattern pointer values, each pointer value indicating the portion of said framing pattern to which said input signal information corresponds;

means for pointer update connected to said pattern matching means and said storage means, said pointer update means operated in response to each match signal to update the framing pattern pointer value associated with said portion of said input signal to indicate the next contiguous portion of said framing pattern; and a framing counter operated in response to said match signal to output a frame aligning signal thereby indicating which of said data and framing information is framing information.

2. A framing system as recited in claim 1, wherein said pattern matching means receives said framing pattern pointer values, said pointer values effective to indicate said portion of said framing pattern to which to compare said input signal information.

3. A framing system as recited in claim 2, wherein:

said pointer update means further generates a framing pattern start signal indicating said portion of said framing pattern to which said input signal information corresponds is the start of said framing pattern; and said framing counter outputs a frame aligning signal in response to said framing pattern start signal for indicating which of said data and framing information is the start of said data information.

4. A framing system as recited in claim 3, further comprising means for pointer initialization connected to said input signal source and said storage means, said pointer initialization means operated in response to sufficient input signal information to identify unique sub-patterns of said framing pattern within said input information, to initialize said framing pattern pointer values to indicate the unique sub-pattern of said framing pattern to which said input signal information corresponds.

5. A framing system as recited in claim 1, wherein said storage means comprises a plurality of storage locations for storing said framing pattern pointer values, each of said locations associated with one of said framing information bits.

6. A framing system as recited in claim 5, wherein said input signal information and said predetermined framing pattern are associated with a predetermined framing format, said predetermined framing formats including T1 data multiplexer, super-frame, extended super-frame, and SLC-96 framing formats.

* * * * *